United States Patent Office 3,662,019
Patented May 9, 1972

3,662,019
PRODUCTION OF MONOOLEFINS
Jan L. Stratenus, Amsterdam, Netherlands, assignor to Shell Oil Company, New York, N.Y.
No Drawing. Filed May 18, 1970, Ser. No. 38,594
Claims priority, application Netherlands, June 5, 1969, 6908540
Int. Cl. C07c 3/28
U.S. Cl. 260—683.3                    7 Claims

ABSTRACT OF THE DISCLOSURE

Paraffins are dehydrogenated by contact with a supported noble metal catalyst, which additionally contains at least one metal of Groups IIb and VIIb, at a temperature of from 350° C. to 550° C. and in the presence of hydrogen.

BACKGROUND OF THE INVENTION

The present invention relates to the dehydrogenation of saturated hydrocarbons. More particularly, the invention relates to an improved process for the catalytic dehydrogenation of paraffinic hydrocarbons to corresponding monoolefins.

Many catalysts and processes have been proposed for bringing about the dehydrogenation of saturated hydrocarbons to yield unsaturated hydrocarbons. Among the catalysts suggested have been those containing noble metals such as platinum and palladium and a support or carrier such as alumina, silica and combinations thereof. Investigtion of these particular prior art catalysts as used in the known processes has revealed many instances of low catalyst activity and also of excessive coking or carbon formation and rapid decline in catalyst activity. Further, and more important, these prior art catalysts have been found to cause undesired side reactions, particularly aromatization, skeletal isomerization and cracking, and to produce undesired quantities of polyunsaturated hydrocarbons such as dienes and trienes. When the desired dehydrogenation product is a mono-ethylenically unsaturated hydrocarbon, the side reactions have been found to reduce the efficiency of the processes to such an extent that the processes wherein they occur and the catalysts used therein are not economically practical.

STATEMENT OF THE INVENTION

In accordance with the present invention acyclic saturated hydrocarbons are dehydrogenated to form mono-olefinically unsaturated hydrocarbons with substantially improved efficiency by contacting the acyclic saturated hydrocarbons under dehydrogenating conditions with a supported noble metal dehydrogenation catalyst which additionally contains one or more metals of Groups IIb and VIIb of the Periodic Table. The use of these Group IIb or VIIb metal-containing supported noble metal catalysts in the dehydrogenation of saturated acyclic hydrocarbons considerably minimizes many of the disadvantages generally inherent in noble metal dehydrogenation processes used heretofore. These catalysts have high catalytic activity as indicated by high conversions of saturated hydrocarbons. They are also highly selective, giving high yields of mono-olefinically unsaturated hydrocarbons with minimal amounts of poly-olefins, cracking products and the like.

DETAILED DESCRIPTION OF THE INVENTION

Catalyst.—The catalyst employed in the process of the invention contains a noble metal, at least one metal of the IIb and VIIb Groups of the Periodic Table and optionally a lithium promoter on a porous inert support.

By "noble metal," as that term is used herein, is meant a metal from Group VIII of atomic number from 44 to 78, inclusive, i.e., platinum, palladium, iridium, ruthenium, osmium and rhodium. Palladium and platinum are preferred, with platinum being the most preferred noble metal. Mixtures of two or more noble metals may be employed.

The amount of noble metal in the catalysts of the invention may vary from as low as 0.05 percent by weight to as high as 5.0 percent by weight of the total composition. Generally, amounts of the noble metals in excess of the above limits are avoided because of the relatively high cost of these metals, and proportions below those defined above give impractically low conversions. Usually, the proportion of noble metal is within the range of from 0.05 to 2.0 percent by weight of the total catalyst. In a preferred practice of the invention, using the preferred noble metals, the noble metal is present in the catalyst in the amount of 0.1 to 1.0 percent by weight of the composition.

One or more metals of Groups IIb (i.e., zinc, cadmium, and mercury) or Group VIIb (i.e., manganese, technetium and rhenium) must be present in the catalysts. Of these metals, cadmium, zinc and rhenium give the best results and are therefore preferred. While mixtures of metals of Groups IIb and VIIb are suitable, it is preferred for simplicity to employ but one such metal. The amount of Group IIb or VIIb metal may be chosen over a wide range. It is generally suitable to employ from 0.2 to 10 gram-atoms of Group IIb or VIIb metal for each gram-atom of noble metal present. Usually it is preferred to use from 0.5 to 5 gram-atoms of Group IIb or VIIb metal per gram-atom of noble metal. In a mosf preferred practice, 1 to 4 gram-atoms of cadmium, zinc or rhenium are employed for each gram-atom of the most preferred noble metal, platinum.

Optionally the catalysts also contain a lithium promoter in amounts of from about 0.01 to 2 percent by weight and most suitably from 0.1 to 0.5 percent by weight. This optional lithium promoter can be present as metal, as a salt, as oxide, or as hydroxide, or mixtures thereof.

The catalyst metals are carried on in an inert porous support. Typical materials for suitable supports are the mixed or unmixed refractory oxides such as the aluminas, silicas, and the like. Suitable supports generally have specific surface areas of from about 5 m.$^2$/g. to 600 m.$^2$/g. and preferably from 10 m.$^2$/g. to 150 m.$^2$/g. As is known, highly acidic catalyst supports are not inert in the presence of hydrocarbons at elevated temperatures, tending to promote side reactions, and hence should be avoided. Very suitable supports are the nonacidic aluminas. The surface areas of the commercially available aluminas can be readily adjusted, if necessary, into the preferred ranges by subjecting these aluminas to a relatively high temperature (i.e., between 900 and 1200° C.) treatment before or after deposition thereon of the noble metal.

The shape of the catalyst support is not of major importance; the catalyst may be used in the form of powders, flakes, spheres, pellets, rings, extrudates, or in any other suitable form. Catalyst particles of various dimensions may be used. The reaction proceeds excellently using pellets about 2–4 mm. in diameter, as well as with powders of which the particles have a size of 15–35 mesh (largest diameter about 1.3–0.5 mm.).

The metals may be deposited on the carriers in any suitable manner. The metals may be deposited separately, and in any sequence, or simultaneously. Impregnation of the carrier with a solution (preferably an aqueous solution) of a compound of the metal to be deposited is a simple and satisfactory method. Very suitable water-soluble platinum compounds are, for example, chloroplatinic acid and tetrammine platinum hydroxide. The many water-soluble Group IIb and VIIb salts include, for example, the acetates and nitrates of zinc and cadmium and the water-soluble heptoxide of rhenium.

After impregnation with solutions of the desired metal compounds the carriers are dried, for instance for a few hours at 120° C., in order to remove the solvent, and then, if desired, calcined for a few hours at temperatures of, for instance, 400–600° C. The noble metal and the metal of Group IIb or Group VIIb initially present as salts must be subsequently converted into the metallic form, which can very suitably be done by hydrogen reduction at an elevated temperature. In many cases heating the impregnated carrier in a hydrogen atmosphere to the temperature at which the dehydrogenation reaction is carried out is sufficient to effect reduction to a metallic state.

The process.—In the process of the invention, acyclic saturated hydrocarbon (paraffin) is contacted with the catalyst under dehydrogenation conditions. Preferred as hydrocarbon starting materials are acyclic paraffins (alkanes) containing at least 6 carbon atoms, and preferably from 6 to 20 carbon atoms, and mixtures thereof containing, for instance, mixtures of paraffins containing from 6 to 10 carbons, 11 to 14 carbons or 14 to 18 carbons. The acyclic mono-olefins which result from such paraffin mixtures find great utility as feedstocks for the preparation of plasticizer and detergent alcohols, lubricating oil additives and the like.

By preference, hydrogen is present during the dehydrogenation of paraffins with the process of the invention. This leads to a longer catalyst life and minimizes side reactions. A molar ratio of hydrogen to the paraffin to be dehydrogenated between 1:1 and 15:1 is very suitable, with a molar ratio of hydrogen to paraffin of between 2:1 and 9:1 being preferred. It is often of advantage to add some water to the feed (for instance between 400 and 3000 parts per million parts of feed) to retard the decline of the catalyst activity. For this purpose, it is also possible to use small amounts (for instance, 50–150 parts per million of feed) of sulfur-containing compounds (such as mercaptans) or (for instance 100–400 parts per million of feed) nitrogen-containing compounds (such as ammonia).

The dehydrogenation according to the invention can be carried out at pressures up to 10 atmospheres. The yield of the desired mono-olefinically unsaturated hydrocarbons is often somewhat higher if the pressure is chosen somewhat lower. Pressures of from 0.75 to 5 atmospheres are preferred with pressures of 0.9 to 3 atmospheres being most preferred.

Suitable dehydrogenation temperatures are between about 350° C. and 550° C. with temperatures between 375 and 500 being preferred and temperatures between 400° C. and 475° C. being most preferred.

At these temperatures and pressures the feedstocks and products are all present as gases. The process of the invention is most suitably carried out continuously, although batch operation is, of course, possible. A continuous process may use a fixed bed of the catalyst, or a fluidized bed in which the catalyst is kept in the fluidized state by the gas streams. If necessary or desired, to this end an inert gas (for instance nitrogen) may, together with the starting hydrocarbons and (if present) hydrogen, be passed through the catalyst, in order to keep it in the fluidized state. The velocity (LHSV) of the hydrocarbons over the catalyst may be varied within wide limits. In general, it is recommended to use velocities of 1 to 40 liters of liquid starting hydrocarbon per liter of catalyst per hour. Velocities of from 2 to 20 liters of liquid starting hydrocarbon per liter of catalyst per hour are preferred with LHSV's of from 3 to 15 liters per liter per hour being most preferred.

The olefins produced by the process of the invention are suitably recovered by a variety of known methods such as preferential absorption with cuprous salt solutions, adsorption by molecular sieves and the like.

To further illustrate the process of the invention, the following examples are provided. It should be understood that the details thereof are not to be regarded as limitations as they may be varied as will be understood by one skilled in this art.

Example I (A) A high surface area non-acidic alumina was heated at 1000° C. for 4 hours, to decrease the specific surface area from 332 m.²/g. to 62 m.²/g. The alumina was then impregnated with an aqueous solution of tetrammine platinum hydroxide and dried at 120° C. The platinum was converted into its elemental form by calcination at 500° C. for 3 hours. Platinum content was 0.5 percent by weight. Five gram-atoms of cadmium per gram-atom of platinum were then added by impregnating the material with the required measured amount of an aqueous solution of cadmium acetate, drying at 120° C., calcining at 500° C. for four hours, and reducing the cadmium with hydrogen at 500° C.

(B) A mixture of n-dodecane and hydrogen in a molar ratio of 1 to 3 was passed over a fixed bed of the catalyst of part A. The temperature was 450° C., the pressure was two atmospheres, and the LHSV was 4.6 liters/liter/hour.

The experiment was repeated under the same conditions, except that the temperature at which the dodecane-hydrogen mixture was passed over the catalyst was 400° C. Table I gives the conversions of the dodecane and selectivities to dodecene (i.e., percentage of converted dodecane to dodecene) at various reaction times.

TABLE I

| | 400° C. | | 450° C. | |
|---|---|---|---|---|
| Reaction time | Conversion [1] | Selectivity [2] | Conversion [1] | Selectivity [2] |
| Hours: | | | | |
| 2 | 11.5 | 93.9 | 32 | 58.4 |
| 20 | 9.8 | 95.9 | 16.4 | 79.3 |
| 24 | 11.1 | 93.7 | .15.8 | 77.8 |
| 90 | 9.3 | 97.8 | 8.7 | 82.8 |

[1] In percent, of dodecane.
[2] In percent, to dodecene.

Example II and Comparative Experiment A

Two catalysts containing 0.5 percent by weight of platinum were prepared in the same manner and with the same materials used in Example I. One catalyst contained 3-gram-atoms of cadmium for each gram-atom of platinum while the other catalyst (not according to the invention) contained no Group IIb or Group VIIb metal. These catalysts were tested under identical conditions. At atmospheric pressure at 450° C. a mixture of dodecane and hydrogen (molar ratio 1:3) was passed over both catalysts at an LHSV of 4.6 liters per liter per hour. Table II shows that the conversions and (after a few run hours) the selectivities to dodecene of the catalysts according to the invention are far higher than observed with the catalyst not according to the invention.

TABLE II

| | Catalyst according to the invention | | Catalyst not according to the invention | |
|---|---|---|---|---|
| Reaction time | Conversion [1] | Selectivity [2] | Conversion [1] | Selectivity [2] |
| Hours: | | | | |
| 2 | 31.5 | 59.5 | 17.7 | 73 |
| 20 | 15.9 | 81.7 | 7.9 | 68 |
| 24 | 15.3 | 80.5 | 6.2 | 79 |

[1,2] See footnotes bottom Table I.

EXAMPLE III

A catalyst was prepared in the manner described in Example I. At 450° C. a mixture of n-dodecane and hydrogen in a molar ratio of 1:8 was passed over this catalyst at atmospheric pressure, and an LHSV of 4.6 (liters/liter)/hour. Table III gives the results.

TABLE III

| Reaction time | Conversion [1] | Selectivity [2] |
|---|---|---|
| Hours: | | |
| 2 | 25.6 | 80.9 |
| 70 | 16.5 | 88.5 |

[1,2] See footnotes, bottom of Table I.

EXAMPLE IV

Two catalysts (catalysts A and B) were prepared in an analogous manner; in the case of catalyst A the carrier was the alumina described in Example I. In the case of catalyst B 0.5% by weight lithium in the form of lithium hydroxide had been deposited on this carrier. In both cases 0.5% by weight platinum was applied in the manner described in Example I, and subsequently the carrier was in both cases impregnated with an aqueous cadmium acetate solution to add 2 gram-atoms of cadmium per gram-atom of platinum. Drying, calcination and reduction were carried out as described in Example I. At 450° C. a mixture of dodecane and hydrogen, in a molar ratio of 1:3 was passed over both catalysts A and B at a pressure of 1 atmosphere and at an LHSV of 3.4 (liters/liter)/hour. Table IV gives the results.

TABLE IV

| | Catalyst A | | Catalyst B | |
|---|---|---|---|---|
| Reaction time | Conversion [1] | Selectivity [2] | Conversion [1] | Selectivity [2] |
| Hours: | | | | |
| 0.5 | 29.6 | 46.2 | 28.0 | 66.4 |
| 2 | 28.2 | 55.0 | 24.7 | 71.7 |
| 24 | 16.9 | 79.9 | 20.8 | 80.8 |

[1,2] See footnotes, bottom of Table I.

EXAMPLE V

Lithium, in the form of lithium hydroxide, was applied in an amount of 0.5 percent by weight on a non-acidic alumina with a specific surface area of 75 m.²/g. by impregation with an aqueous lithium hydroxide solution, followed by evaporation of the water. Subsequently, 0.5% by weight of platinum was applied in the manner described in Example I, and the carrier was impregnated with an aqueous solution of cadmium acetate containing 3 gram-atoms cadmium per gram-atom platinum present. After drying and calcining, the cadmium was converted into its metallic form as described in Example I.

At atmospheric pressure and 450° C. a mixture of dodecane and hydrogen in a molar ratio of 1:8, was passed over the catalyst thus obtained at an LHSV of 4.6 (liters/liter)/hour. The results are given in Table V.

TABLE V

| Reaction time | Conversion [1] | Selectivity [2] |
|---|---|---|
| Hours: | | |
| 2 | 30.0 | 68.3 |
| 24 | 25.2 | 81.7 |
| 48 | 21.4 | 86.0 |
| 90 | 19.2 | 86.5 |
| 162 | 15.1 | 88.1 |

[1,2] See footnotes, bottom of Table I.

EXAMPLE VI

A catalyst was prepared in the same manner as described in Example I, except that the impregnation was carried out with an aqueous solution of rhenium heptoxide, instead of with an aqueous solution of cadmium acetate. The rhenium heptoxide solution contained 2 gram-atoms rhenium per gram-atom platinum present in the carrier. At 425° C. and atmospheric pressure a mixture of dodecane and hydrogen, in a molar ratio of 1:3, was passed over the catalyst at an LHSV of 4.6 (liters/liter)/hour.

In another experiment a mixture of dodecane and hydrogen in a molar ratio of 1:8, was passed over the same catalyst at the same pressure and velocity, but at a temperature of 450° C. Table VI gives the results.

TABLE VI

| | 425° C. | | 450° C. | |
|---|---|---|---|---|
| Reaction time | Conversion [1] | Selectivity [2] | Conversion [1] | Selectivity [2] |
| Hours: | | | | |
| 2 | 19.7 | 79.7 | 21.8 | 73.9 |
| 24 | | | 19.4 | 84.8 |
| 48 | | | 18.8 | 85.6 |
| 72 | 12.0 | 91.7 | 18.3 | 85.8 |

[1,2] See footnotes, bottom of Table I.

EXAMPLE VII

A catalyst was prepared in the same manner as described for catalyst B in Example IV, except that the impregnation was carried out with an aqueous solution of zinc acetate instead of with an aqueous solution of cadmium acetate. The zinc acetate solution contained 2 gram-atoms zinc per gram-atom platinum present on the carrier. At 450° C. a mixture of dodecane and hydrogen in a molar ratio of 1:3 was passed over the catalyst at atmospheric pressure and an LHSV of 6.8 (liters/liter)/hour. The results are given in Table VII.

TABLE VII

| Reaction time | Conversion [1] | Selectivity [2] |
|---|---|---|
| Hours: | | |
| 0.5 | 22.6 | 82.3 |
| 2 | 22.9 | 81.7 |
| 7 | 20.1 | 83.1 |
| 72 | 11.3 | 85.0 |

[1,2] See footnotes, bottom of Table I.

I claim as my invention:

1. A process for the dehydrogenation of acyclic paraffins of from 6 to 20 carbon atoms to the corresponding monoolefins which comprises contacting the paraffins in vapor phase with a dehydrogenation catalyst consisting essentially of from about 0.05% by weight to about 5% by weight of a noble metal and from about 0.2 to about 10 gram-atoms per gram-atom of noble metal of metals selected from the group consisting of cadmium and zinc on a porous inert support, in the presence of added hydrogen, at a temperature in the range of from 350 to 525° C. and a total pressure of not more than ten atmospheres.

2. The processes of claim 1 wherein the noble metal is selected from the group consisting of platinum and palladium.

3. The process of claim 1 wherein the dehydrogenation catalyst consists essentially of a porous inert support, from 0.05% by weight to about 2.0% by weight of platinum of cadmium.

4. The process of claim 3 wherein the porous inert support is an alumina having a specific area of from 10 m.²/g. to 150 m.²/g.

5. The process of claim 1 wherein the dehydrogenation catalyst consists essentially of a porous inert support, from 0.05% by weight to about 2.0% by weight of platinum and from about 1 to about 4 gram-atoms per gram-atom of platinum of zinc.

6. The process of claim 5 wherein the porous inert support is an alumina having a specific area of from 10 m.²/g. to 150 m.²/g.

7. A process for the dehydrogenation of acyclic paraffins of from 6 to 20 carbon atoms to the corresponding monoolefins which comprises contacting the paraffins in vapor phase with a dehydrogenation catalyst consisting essentially of from about 0.05% by weight to about 5% by weight of a noble metal selected from the group consisting of platinum and palladium, from about 0.2 to about 10 gram-atoms per gram-atom of noble metal of metals selected from the group consisting of cadmium and zinc, and from about 0.01% to 2% by weight of lithium on a porous inert support, in the presence of added hydrogen, at a temperature in the range of from 350 to 525° C. and a total pressure of not more than ten atmospheres has been added.

References Cited
UNITED STATES PATENTS 3,535,402   10/1970   Kluksdahl _____ 260—683.3

DANIEL E. GANTZ, Primary Examiner

V. O'KEEFE, Assistant Examiner